(12) United States Patent
Gopalan

(10) Patent No.: US 10,803,627 B2
(45) Date of Patent: Oct. 13, 2020

(54) ENABLING SECURE VIDEO SHARING BY EXPLOITING DATA SPARSITY

(71) Applicant: AT&T Intellectual Property I, L.P., Atlanta, GA (US)

(72) Inventor: Raghuraman Gopalan, Dublin, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 121 days.

(21) Appl. No.: 16/136,412

(22) Filed: Sep. 20, 2018

(65) Prior Publication Data

US 2020/0098077 A1 Mar. 26, 2020

(51) Int. Cl.
| | |
|---|---|
| *G06T 9/00* | (2006.01) |
| *H04N 19/625* | (2014.01) |
| *H04N 19/63* | (2014.01) |
| *H04N 19/62* | (2014.01) |
| *H04N 19/426* | (2014.01) |

(52) U.S. Cl.
CPC .............. *G06T 9/007* (2013.01); *G06T 9/002* (2013.01); *H04N 19/428* (2014.11); *H04N 19/62* (2014.11); *H04N 19/625* (2014.11); *H04N 19/63* (2014.11)

(58) Field of Classification Search
CPC ....... G06T 9/007; G06T 9/002; H04N 19/428; H04N 19/625; H04N 19/63; H04N 19/62
See application file for complete search history.

(56) References Cited

U.S. PATENT DOCUMENTS

| | | | |
|---|---|---|---|
| 7,016,540 B1 | 3/2006 | Gong et al. | |
| 8,913,835 B2 | 12/2014 | Kumar et al. | |
| 9,665,775 B2 | 5/2017 | Kumar et al. | |
| 9,710,727 B2 | 7/2017 | Bala et al. | |
| 10,057,383 B2 | 8/2018 | Shoaib et al. | |
| 2014/0211039 A1* | 7/2014 | Herman | G06T 9/00 348/222.1 |
| 2016/0249065 A1* | 8/2016 | Haimi-Cohen | H04N 19/15 |
| 2017/0116481 A1 | 4/2017 | Chen et al. | |
| 2017/0178346 A1* | 6/2017 | Ferro | G06N 3/04 |
| 2019/0340497 A1* | 11/2019 | Baraniuk | H03M 7/3062 |

* cited by examiner

*Primary Examiner* — Casey L Kretzer

(57) ABSTRACT

In one example, the present disclosure describes a device, computer-readable medium, and method for enabling secure video sharing by exploiting data sparsity. In one example, the method includes applying a transformation to a video dataset containing a plurality of video samples, to produce a plurality of sparse vectors in a first dimensional space, wherein each sparse vector of the plurality of sparse vectors corresponds to one video sample of the plurality of video samples, and multiplying each sparse vector of the plurality of sparse vectors by a transformation matrix to produce a plurality of reduced vectors in a second dimensional space, wherein the dimension of the second dimensional space is smaller than a dimension of the first dimensional space, and wherein the plurality of reduced vectors in the second dimensional space hides information about the video dataset while preserving relational properties between the plurality of video samples.

20 Claims, 4 Drawing Sheets

ENABLING SECURE VIDEO SHARING BY EXPLOITING DATA SPARSITY

The present disclosure relates generally to data security, and relates more particularly to devices, non-transitory computer-readable media, and methods for enabling secure video sharing by exploiting data sparsity.

BACKGROUND

Data-powered machine learning applications and services have proven useful in various fields including medicine, retail, financial services, the automotive industry, and others. For instance, machine learning can help a business detect patterns, market trends, and customer preferences in large, complex data sets in a more accurate and more efficient manner than would be possible for a human analyst.

SUMMARY

In one example, the present disclosure describes a device, computer-readable medium, and method for enabling secure video sharing by exploiting data sparsity. In one example, the method includes applying a transformation to a video dataset containing a plurality of video samples, to produce a plurality of sparse vectors in a first dimensional space, wherein each sparse vector of the plurality of sparse vectors corresponds to one video sample of the plurality of video samples, and multiplying each sparse vector of the plurality of sparse vectors by a transformation matrix to produce a plurality of reduced vectors in a second dimensional space, wherein the dimension of the second dimensional space is smaller than a dimension of the first dimensional space, and wherein the plurality of reduced vectors in the second dimensional space hides information about the video dataset while preserving relational properties between the plurality of video samples.

In another example, a device includes a processor and a non-transitory computer-readable medium storing instructions which, when executed by the processor, cause the processor to perform operations. The operations include applying a transformation to a video dataset containing a plurality of video samples, to produce a plurality of sparse vectors in a first dimensional space, wherein each sparse vector of the plurality of sparse vectors corresponds to one video sample of the plurality of video samples, and multiplying each sparse vector of the plurality of sparse vectors by a transformation matrix to produce a plurality of reduced vectors in a second dimensional space, wherein the dimension of the second dimensional space is smaller than a dimension of the first dimensional space, and wherein the plurality of reduced vectors in the second dimensional space hides information about the video dataset while preserving relational properties between the plurality of video samples.

In another example, a non-transitory computer-readable medium stores instructions which, when executed by a processor, cause the processor to perform operations. The operations include applying a transformation to a video dataset containing a plurality of video samples, to produce a plurality of sparse vectors in a first dimensional space, wherein each sparse vector of the plurality of sparse vectors corresponds to one video sample of the plurality of video samples, and multiplying each sparse vector of the plurality of sparse vectors by a transformation matrix to produce a plurality of reduced vectors in a second dimensional space, wherein the dimension of the second dimensional space is smaller than a dimension of the first dimensional space, and wherein the plurality of reduced vectors in the second dimensional space hides information about the video dataset while preserving relational properties between the plurality of video samples.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a method, apparatus, and non-transitory computer readable storage medium for enabling secure video sharing by exploiting data sparsity. As discussed above, data-powered machine learning applications and services have proven useful in various fields including medicine, retail, financial services, the automotive industry, and others. These machine learning applications and services rely on the sharing of digital data. With mobile technology making it easier for individuals to access and share data anytime and anywhere, video data in particular is emerging as one of the most popular, if not the most popular, types of data being shared.

Examples of the present disclosure use random projections to preserve the security of video data. The video data may be shared for the purposes of building machine learning applications. In particular, examples of the present disclosure exploit the concept of data sparsity in video data. Digital video, unlike many other types of digital data, is generally sparse in wavelet transform, Fourier transform, or discrete cosine transform (DCT) bases. Sparse, N-dimensional vectorized video data (x) can be transformed into a (relatively) low, M-dimensional vector (y) by multiplying the N-dimensional vector by a random M×N matrix. In this case, M<N, i.e., the M-dimensional space is of a lower dimension than the N-dimensional space. It is very difficult to infer details about the N-dimensional vector from the M-dimensional vector; however, the N-dimensional vector can be recovered from the M-dimensional vector with knowledge of the M×N matrix. Moreover, new data obtained in the M-dimensional space can be reliably visualized back in the N-dimensional space.

Figure 1:
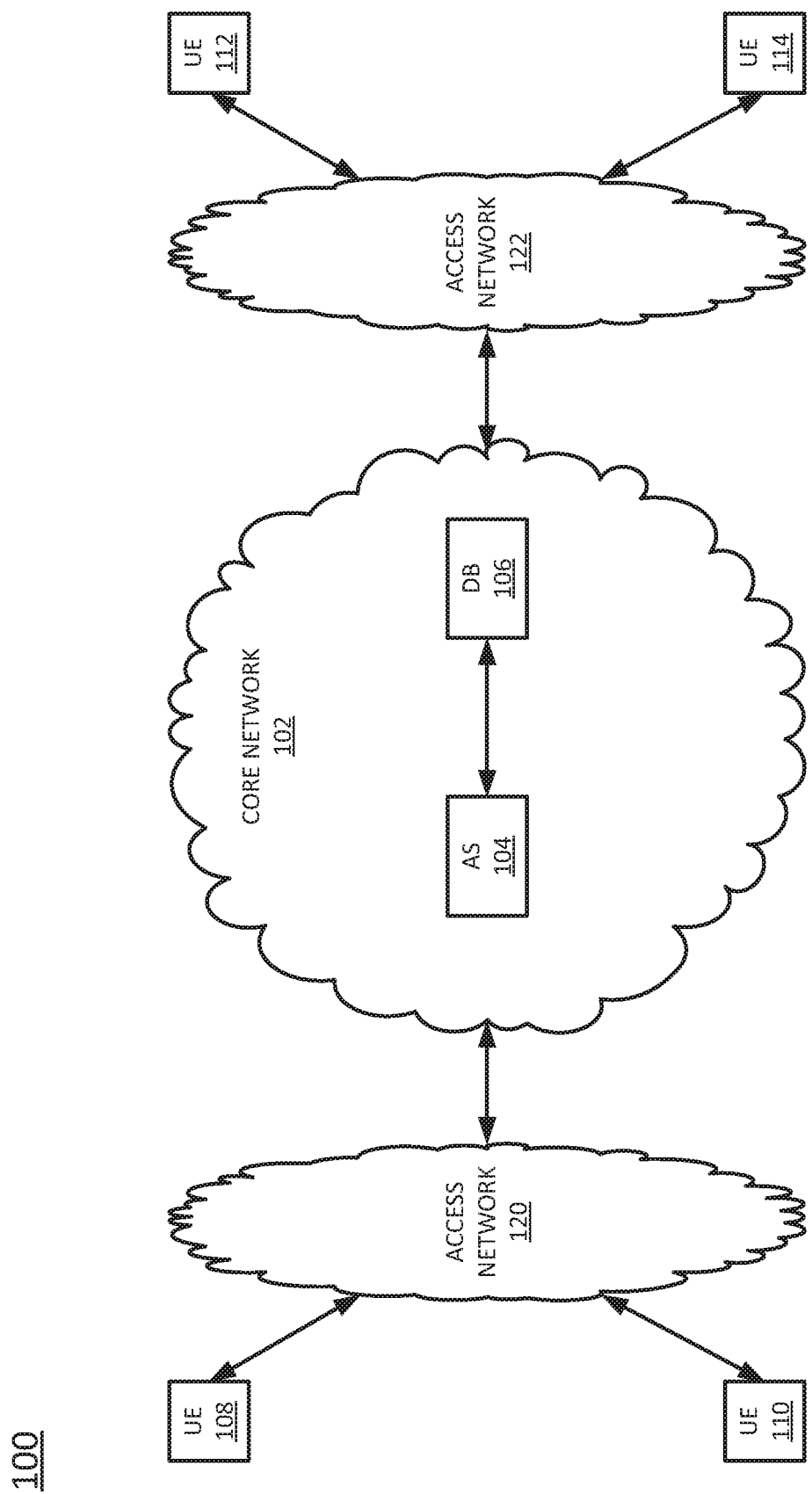
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one example, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although only a single AS 104 and a single DB 106 are illustrated, it should be noted that any number of application servers 104 or databases 106 may be deployed. Furthermore, for ease of illustration, various additional elements of core network 102 are omitted from FIG. 1.

Figure 4:
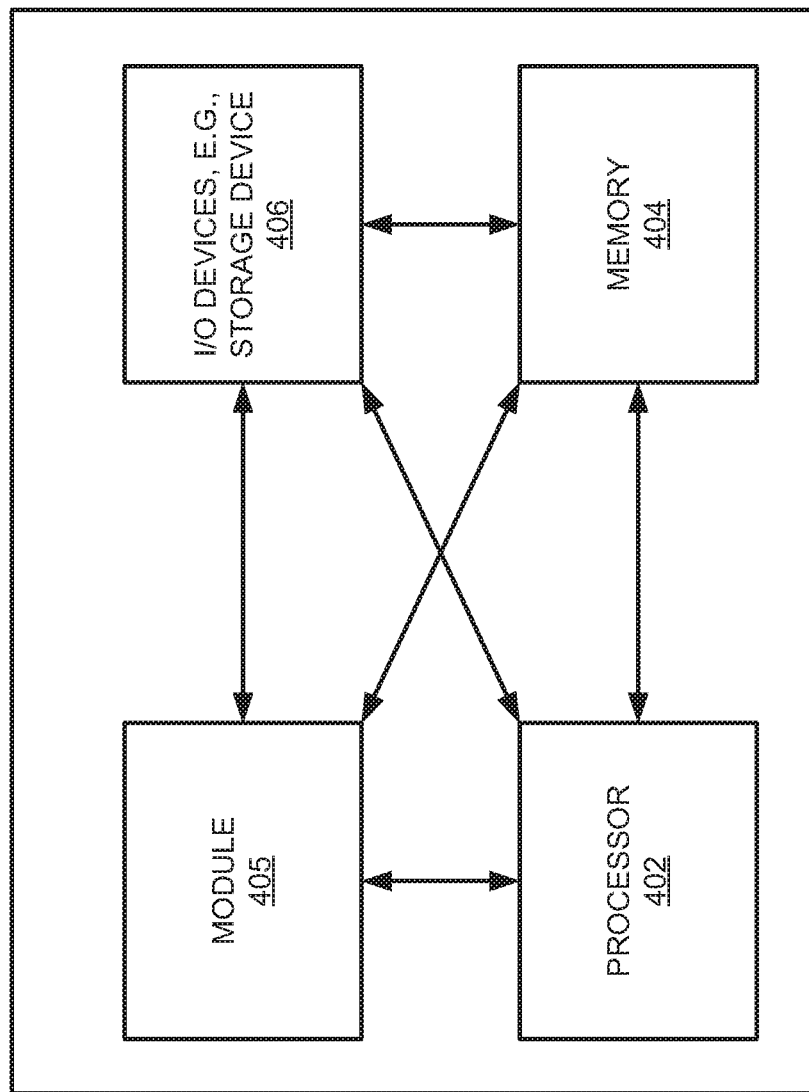

In one embodiment, the AS 104 may comprise a computing device specifically programmed to perform the functions described herein, as illustrated in FIG. 4 and discussed below. In one embodiment, the AS 104 may perform the methods discussed below related to enabling secure video sharing. For instance, the AS 104 may transform a video dataset into one or more sparse vectors in a first dimensional space. The AS 104 may further transform the sparse vectors in the first dimensional space into one or more vectors in a second dimensional space (which may be of a lower dimension than the first dimensional space). In a further example still, the AS 104 may construct and/or train machine learning models using video data that has been transformed for secure sharing.

In one example, the DB 106 may store video data sets. The DB 106 may also store vectors representing samples contained in the video data sets. For instance, the DB 106 may store the vectors in the first and/or second dimensional spaces discussed above. In addition, the DB 106 may store one or more transformation matrices for use (e.g., by the AS 104) in transforming vectors from the first dimensional space to the second dimensional space and/or vice versa.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114. Access networks 120 and 122 may transmit and receive communications between respective UEs 108, 110, 112, and 114 and core network 102 relating to communications with web servers, AS 104, and/or other servers via the Internet and/or other networks, and so forth.

In one embodiment, the user endpoint devices 108, 110, 112, and 114 may be any type of subscriber/customer endpoint device configured for wired and/or wireless communication such as a desktop computer, a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box (STB), and the like. In one example, any one or more of the user endpoint devices 108, 110, 112, and 114 may have both cellular and non-cellular access capabilities and may further have wired communication and networking capabilities. It should be noted that although only four user endpoint devices are illustrated in FIG. 1, any number of user endpoint devices may be deployed.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, any one or more of the user endpoint devices 108, 110, 112, and 114 may host an operating system for presenting a user interface that may be used to send data to the AS 104 (e.g., video datasets for sharing, requests for data, requests for machine learning models, etc.) and for reviewing data sent by the AS 104 (e.g., results of machine learning models, video datasets, etc.).

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
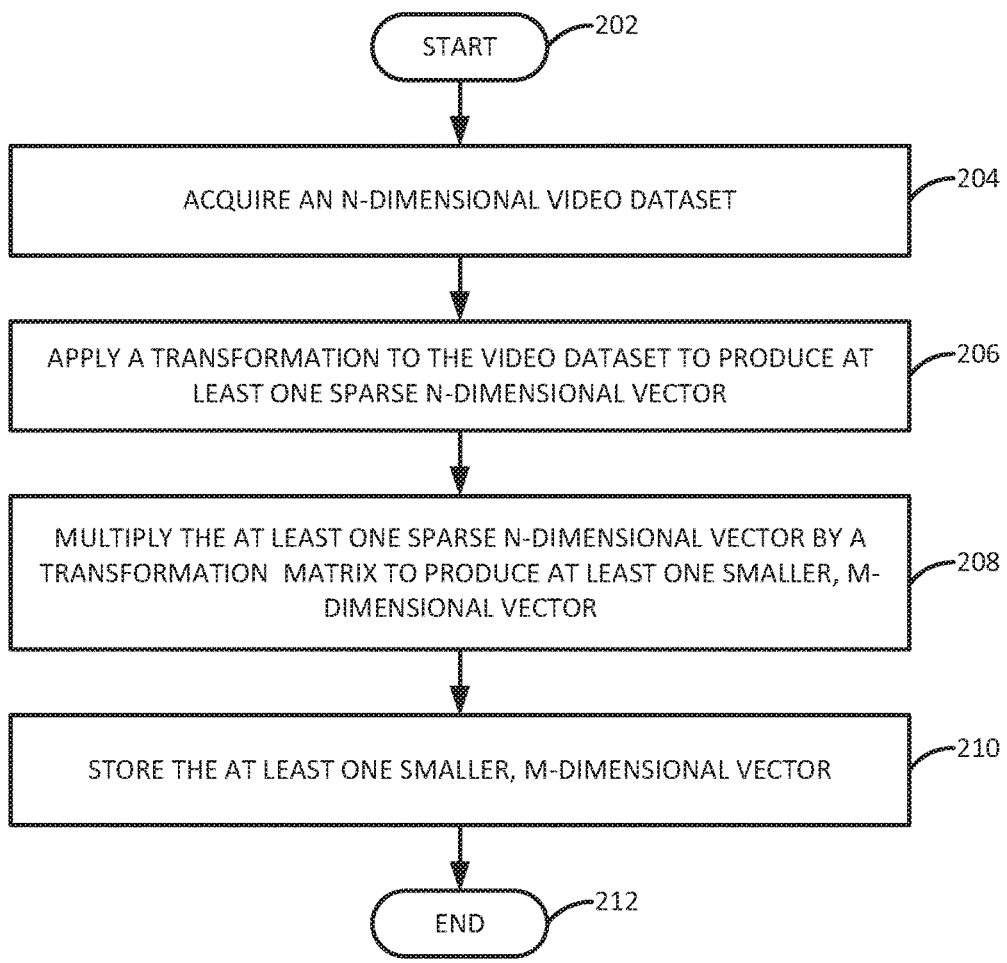
FIG. 2 illustrates a flowchart of an example method for enabling secure video sharing.

To further aid in understanding the present disclosure, FIG. 2 illustrates a flowchart of an example method 200 for enabling secure video sharing. In one example, the method 200 may be performed by an application server, e.g., AS 104 illustrated in FIG. 1 or the computing device 400 illustrated in FIG. 4. However, any references in the discussion of the method 200 to the AS 104 of FIG. 1 or the computing device 400 of FIG. 4 are not intended to limit the means by which the method 200 may be performed. For illustrative purposes, the method 200 is described in greater detail below in connection with an example performed by a processing system.

Figure 3:
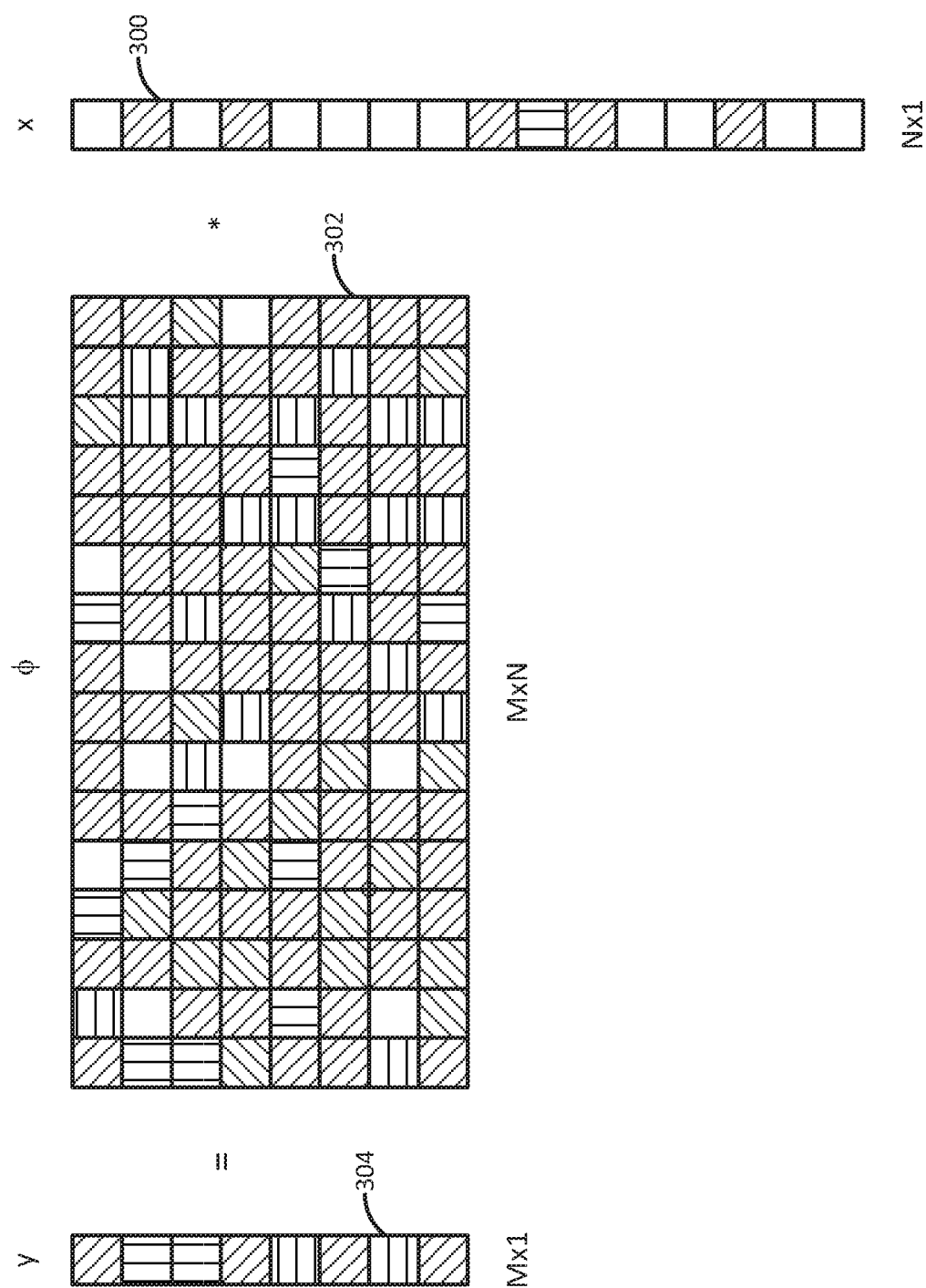
FIG. 3 illustrates example vectors representing an example video dataset that may be transformed in accordance with the method of FIG. 2 to protect data contained therein and FIG. 4 depicts a high-level block diagram of a computing device specifically programmed to perform the functions described herein.

FIG. 2 may be referred to in conjunction with FIG. 3, which illustrates example vectors 300 and 304 representing an example video dataset that may be transformed in accordance with the method 200 of FIG. 2 to protect data contained therein.

The method 200 begins in step 202. In step 204, the processing system may acquire a N-dimensional video dataset, D. The video dataset may contain a plurality of digital videos for a given video processing task. The plurality of digital videos may correspond to any video application. In one example, the video dataset D includes labels, L (e.g., for supervised learning). In another example, however, the video dataset D includes no labels.

In step 206, the processing system may apply a transformation, T, to the video dataset D. Application of the transformation T to the video dataset D produces one sparse N-dimensional vector, x, for each sample (i.e., individual video) in the video dataset D. Thus, as a result of step 206, a plurality of N-dimensional vectors x will be produced (e.g., one N-dimensional vector x for each sample in the video dataset D). FIG. 3, for instance, illustrates an example N-dimensional vector 300 that may be produced in accordance with step 206 of the method 200. In the example illustrated, shaded blocks of the N-dimensional vector 300 represent non-zero pixel level values for corresponding pixels of a sample, while unshaded blocks of the N-dimensional vector 300 represent zero pixel level values. The pixel level values describe how bright and/or what color the corresponding pixels should be. In one example, the transformation T may comprise a wavelet transform, a Fourier transform, or a discrete cosine transform.

In step 208, the processing system may multiply each N-dimensional vector x by a random M×N transformation matrix, $\varphi$, where M<N. FIG. 3, for instance, illustrates an example M×N transformation matrix 302. As illustrated, M<N (e.g., in this example, M=8 and N=16, but N does not necessarily have to be twice as big as N).

Multiplication of an N-dimensional vector x by the transformation matrix $\varphi$ produces a smaller (or "reduced") M-dimensional vector, y. FIG. 3, for instance illustrates an example M-dimensional vector 304 that may be produced by multiplying the example N-dimensional vector 300 by the M×N transformation matrix 302. Thus, as a result of step 208, a plurality of M-dimensional vectors y (similar to the M-dimensional vector 304 of FIG. 3) will be produced (e.g., one M-dimensional vector y for each x-dimensional vector in the original video dataset D). The resultant plurality of M-dimensional vectors y may be collectively referred to as D*. D* also represents the secure data domain in which the original information about the N-dimensional video dataset D is hidden. However, the relational properties of the N-dimensional video dataset D are preserved in the secure domain D*.

Each M-dimensional vector y produced in step 208 preserves pairwise distances in the original video dataset D. For instance, the distance ratios between three example original videos (or samples) $x_1$, $x_2$, and $x_3$ would be equal to the distance ratios between three example transformed videos $y_1$, $y_2$, and $y_3$ corresponding to the example original videos $x_1$, $x_2$, and $x_3$.

Moreover, little trace of the original video dataset D can be found in the plurality of M-dimensional vectors D*. That is, it is very difficult to infer details about the plurality of N-dimensional vectors x from the plurality of M-dimensional vectors y. Thus, the plurality of M-dimensional vectors D* securely protects the data contained in the original video dataset D.

The original video dataset D can be reconstructed from the plurality of M-dimensional vectors D*, but only with knowledge of the transformation matrix cp. With knowledge of the transformation matrix $\varphi$, one can derive the plurality of N-dimensional vectors x from the corresponding plurality of M-dimensional vectors y.

The processing system may store the plurality of M-dimensional vectors y, e.g., in the DB 106 of FIG. 1, in step 210.

The method may end in step 212.

The plurality of M-dimensional vectors D* produced by the method 200 may be provided as inputs to a machine learning technique that seeks to build a machine learning model R for detecting patterns, market trends, customer preferences, and/or other data relationships. If labels L are available with the original video dataset D, then the plurality of M-dimensional vectors D* may be provided as inputs to a supervised machine learning technique. However, if labels are not available with the original video dataset D, then the plurality of M-dimensional vectors D* may be provided as inputs to an unsupervised machine learning technique. The utility of the plurality of M-dimensional vectors D* is not limited to a specific type of machine learning technique.

Moreover, accuracy metrics for the machine learning model R may be securely computed using the learned data representations. The performance of accuracy metrics obtained using the learned data representations of the machine learning model R will be as accurate as any accuracy metrics that may be obtained using the original video dataset D, but will also be more secure. Moreover, new information (e.g., new vectors) obtained in the M-dimensional space (e.g., obtained by building machine learning models using a plurality of data sources) can be reliably visualized in the N-dimensional space (which would facilitate better interpretability). However, as noted above, the results of the machine learning model R cannot be transformed back into the original N-dimensional space without knowledge of the transformation matrix $\varphi$ (e.g., and using inverse mapping).

The ability to reduce the dimension of a video dataset (e.g., from the N-dimensional space to the M-dimensional space) may have utilities beyond data security as well. For instance, reducing the dimension of the video dataset may minimize the amount of space required to store the video dataset. The savings in storage space may reach exponential proportions in the machine learning context, where a machine learning model could be trained using as many as billions of video datasets.

The disclosed approach for enabling secure video sharing may also prove useful for crowd sourcing. For instance, as the need for video data grows, individuals and organizations may find it beneficial to share data with others. The disclosed approach enables powerful data models to be built without directly revealing the original data used to train the data models. Thus, video security can be seamlessly merged with crowd sourced data models.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 may be implemented as the system 400. For instance, an application server could be implemented as illustrated in FIG. 4.

As depicted in FIG. 4, the computing device 400 comprises a hardware processor element 402, a memory 404, a module 405 for enabling secure video sharing, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for enabling secure video sharing may include circuitry and/or logic for performing special purpose functions relating to the tuning individual word weights used for sentiment analysis techniques. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, an output port, or a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, then the computing device of this Figure is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for enabling secure video sharing (e.g., a software program comprising computer-executable instructions) can be loaded into memory 404 and executed by hardware processor element 402 to implement the steps, functions or operations as discussed above in connection with the example methods 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for enabling secure video sharing (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of the disclosure should not be limited by any of the above-described example examples, but should be defined only in accordance with the following claims and their equivalents.

What is claimed is:

1. A method, comprising:
applying, by a processor, a transformation to a video dataset containing a plurality of video samples, to produce a plurality of sparse vectors in a first dimensional space, wherein each sparse vector of the plurality of sparse vectors corresponds to one video sample of the plurality of video samples;
multiplying, by the processor, each sparse vector of the plurality of sparse vectors by a transformation matrix to produce a plurality of reduced vectors in a second dimensional space, wherein a dimension of the second dimensional space is smaller than a dimension of the first dimensional space, and wherein the plurality of reduced vectors in the second dimensional space hides information about the video dataset while preserving relational properties between the plurality of video samples;
providing, by the processor, the plurality of reduced vectors as inputs to a machine learning technique that trains a machine learning model;
acquiring, by the processor, a new vector in the second dimensional space through operation of the machine learning model; and
transforming, by the processor, the new vector, using the transformation matrix, into the first dimensional space.

2. The method of claim 1, wherein the transformation comprises a wavelet transform.

3. The method of claim 1, wherein the transformation comprises a Fourier transform.

4. The method of claim 1, wherein the transformation comprises a discrete cosine transform.

5. The method of claim 1, wherein the video dataset is labeled.

6. The method of claim 1, wherein the transformation matrix is an M×N matrix, wherein N is the dimension of the first dimensional space, and wherein M is the dimension of the second dimensional space.

7. The method of claim 6, wherein the M×N matrix is a random matrix.

8. The method of claim 1, wherein the relational properties comprise pairwise distances.

9. The method of claim 8, wherein distance ratios between pairs of the plurality of sparse vectors are equal to distance ratios between pairs of the plurality of reduced vectors corresponding to the pairs of the plurality of sparse vectors.

10. The method of claim 1, wherein the transformation matrix allows transformation of the plurality of reduced vectors back into the video dataset.

11. A device, comprising:
a processor; and
a non-transitory computer-readable medium storing instructions which, when executed by the processor, cause the processor to perform operations, the operations comprising:
applying a transformation to a video dataset containing a plurality of video samples, to produce a plurality of sparse vectors in a first dimensional space, wherein each sparse vector of the plurality of sparse vectors corresponds to one video sample of the plurality of video samples;
multiplying each sparse vector of the plurality of sparse vectors by a transformation matrix to produce a plurality of reduced vectors in a second dimensional space, wherein a dimension of the second dimensional space is smaller than a dimension of the first dimensional space, and wherein the plurality of reduced vectors in the second dimensional space hides information about the video dataset while preserving pairwise distances between the plurality of video samples;
providing the plurality of reduced vectors as inputs to a machine learning technique that trains a machine learning model;
acquiring a new vector in the second dimensional space through operation of the machine learning model; and
transforming the new vector, using the transformation matrix, into the first dimensional space.

12. A non-transitory computer-readable medium storing instructions which, when executed by a processor, cause the processor to perform operations, the operations comprising:
applying a transformation to a video dataset containing a plurality of video samples, to produce a plurality of sparse vectors in a first dimensional space, wherein each sparse vector of the plurality of sparse vectors corresponds to one video sample of the plurality of video samples;
multiplying each sparse vector of the plurality of sparse vectors by a transformation matrix to produce a plurality of reduced vectors in a second dimensional space, wherein a dimension of the second dimensional space is smaller than a dimension of the first dimensional space, and wherein the plurality of reduced vectors in the second dimensional space hides information about the video dataset while preserving pairwise distances between the plurality of video samples;
providing the plurality of reduced vectors as inputs to a machine learning technique that trains a machine learning model;
acquiring a new vector in the second dimensional space through operation of the machine learning model; and
transforming the new vector, using the transformation matrix, into the first dimensional space.

13. The non-transitory computer-readable medium of claim 12, wherein the transformation matrix is an M×N matrix, wherein N is the dimension of the first dimensional space, and wherein M is the dimension of the second dimensional space.

14. The non-transitory computer-readable medium of claim 13, wherein the M×N matrix is a random matrix.

15. The non-transitory computer-readable medium of claim 12, wherein the relational properties comprise pairwise distances.

16. The non-transitory computer-readable medium of claim 15, wherein distance ratios between pairs of the plurality of sparse vectors are equal to distance ratios between pairs of the plurality of reduced vectors corresponding to the pairs of the plurality of sparse vectors.

17. The non-transitory computer-readable medium of claim 12, wherein the transformation matrix allows transformation of the plurality of reduced vectors back into the video dataset.

18. The non-transitory computer-readable medium of claim 12, wherein the transformation comprises a wavelet transform.

19. The non-transitory computer-readable medium of claim 12, wherein the transformation comprises a Fourier transform.

20. The non-transitory computer-readable medium of claim 12, wherein the transformation comprises a discrete cosine transform.

* * * * *